(12) United States Patent
McGuff et al.

(10) Patent No.: US 7,403,383 B2
(45) Date of Patent: Jul. 22, 2008

(54) DIRECTING AIRFLOW FOR AN INFORMATION HANDLING SYSTEM

(75) Inventors: Matthew Stanley McGuff, Cedar Park, TX (US); Sabrina D. Cauthern, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 11/430,661

(22) Filed: May 9, 2006

(65) Prior Publication Data

US 2007/0263353 A1 Nov. 15, 2007

(51) Int. Cl.
*H05K 7/20* (2006.01)
*H05K 5/00* (2006.01)

(52) U.S. Cl. .................. 361/688; 361/687; 361/690; 361/694; 361/695; 361/724; 361/727; 165/80.3; 165/121; 165/122; 165/126; 439/135; 439/139; 454/184

(58) Field of Classification Search ......... 361/687–695, 361/715, 719, 727, 753, 736, 737, 728; 439/135, 439/139, 65, 149, 940; 165/80.3, 104.33, 165/185; 454/184; 174/16.3; 257/718, 719, 257/726, 727

See application file for complete search history.

(56) References Cited

U.S. PATENT DOCUMENTS

| 4,935,845 | A | * | 6/1990 | Schwehr et al. | 361/694 |
|---|---|---|---|---|---|
| 5,410,448 | A | * | 4/1995 | Barker et al. | 361/695 |
| 5,528,455 | A | * | 6/1996 | Miles | 361/695 |
| 6,198,629 | B1 | * | 3/2001 | Cannon et al. | 361/695 |
| 6,285,548 | B1 | * | 9/2001 | Hamlet et al. | 361/695 |
| 6,512,672 | B1 | * | 1/2003 | Chen | 361/695 |
| 6,738,262 | B2 | * | 5/2004 | Trioli et al. | 361/753 |
| 6,744,632 | B2 | * | 6/2004 | Wilson et al. | 361/695 |
| 6,785,142 | B1 | * | 8/2004 | Regimbal et al. | 361/727 |
| 6,920,050 | B2 | * | 7/2005 | Little et al. | 361/736 |
| 7,092,252 | B2 | * | 8/2006 | Robertson | 361/690 |
| 7,269,006 | B2 | * | 9/2007 | Miyamoto et al. | 361/687 |
| 7,280,356 | B2 | * | 10/2007 | Pfahnl et al. | 361/695 |
| 2004/0161953 | A1 | * | 8/2004 | MacLaren et al. | 439/65 |
| 2007/0053170 | A1 | * | 3/2007 | Yu | 361/737 |
| 2007/0064401 | A1 | * | 3/2007 | Chiang | 361/728 |
| 2007/0121286 | A1 | * | 5/2007 | Foster et al. | 361/687 |

* cited by examiner

*Primary Examiner*—Michael V Datskovskiy
(74) *Attorney, Agent, or Firm*—Haynes and Boone, LLP

(57) ABSTRACT

An information handling system ('IHS') cooling apparatus includes a blank base comprising a pair of opposing ends. A connector engagement member extends from each opposing end of the blank base. A notch is defined by the blank base and located on each opposing end of the blank base. A contacts channel is defined by the blank base and the connector engagement members and extends between the opposing ends of the blank base. The IHS cooling apparatus may be secured in an IHS connector in order to direct airflow over memory devices secured in adjacent IHS connectors.

20 Claims, 9 Drawing Sheets

DIRECTING AIRFLOW FOR AN INFORMATION HANDLING SYSTEM

BACKGROUND

The present disclosure relates generally to information handling systems, and more particularly to directing airflow in an information handling system.

As the value and use of information continues to increase, individuals and businesses seek additional ways to process and store information. One option is an information handling system ('IHS'). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include memory devices that need to be cooled by fans coupled to the IHS. As the memory power density of the memory devices in IHSs increase, achieving the thermal and acoustic goals for the IHS raises a number of issues.

Conventionally, the cooling of the memory devices is typically accomplished by using a fan to move air over the memory devices. However, due to acoustical goals for the IHS, increasing the fan speed in order to provide additional cooling may not be advantageous, as the increased fan speed provides unwanted noise. One proven method for increasing cooling without increasing fan speed is to reduce the amount of bypass airflow around the memory devices. This is typically accomplished by providing an airflow blocking member moveably connected to the IHS chassis. The airflow blocking member typically occupies the space normally taken up by a memory device in the IHS when there is no memory device installed in a memory device slot on the IHS in order to block airflow through that space. The airflow blocking member is then operable to move out of the way of a memory device and into the IHS chassis when the memory device is installed a memory device slot on the IHS.

However, some IHSs include a plurality of densely packed smaller chassis which are positioned in a larger chassis that includes fans for moving air through the plurality of smaller chassis. The smaller chassis also includes memory devices which need to be cooled by the fans, but the densely packed smaller chassis typically do not include the space required to include airflow blocking members moveably connected to the smaller chassis that can move in and out of the space provided for the memory devices in order to block airflow from the fans when memory devices are not present in the memory device slots on the IHS.

Accordingly, it would be desirable to provide for directing airflow in an IHS absent disadvantages, some of which have been discussed above.

SUMMARY

According to one embodiment, an IHS cooling apparatus includes a blank base comprising a pair of opposing ends, a connector engagement member extending from each opposing end of the blank base, a notch defined by the blank base and located on each opposing end of the blank base, and a contacts channel defined by the blank base and the connector engagement members and extending between the opposing ends of the blank base.

BRIEF DESCRIPTION OF THE DRAWINGS

FIG. 4b is a perspective view illustrating an embodiment of the chassis of FIG. 4a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
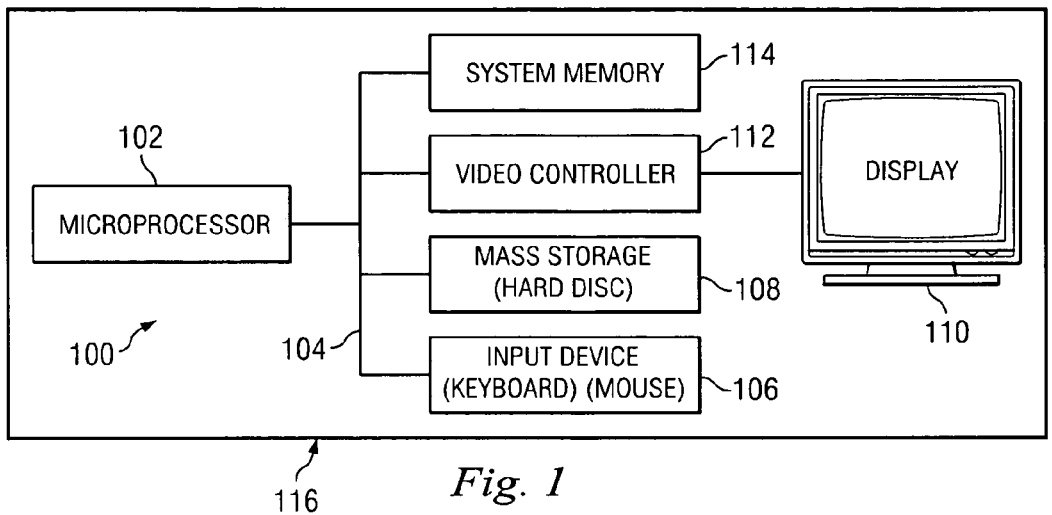
FIG. 1 is a schematic illustrating an embodiment of an IHS.

In one embodiment, IHS 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. IHS 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of IHS 100. It should be understood that other buses and intermediate circuits can be deployed between the components described above and microprocessor 102 to facilitate interconnection between the components and the microprocessor.

Figure 2A:
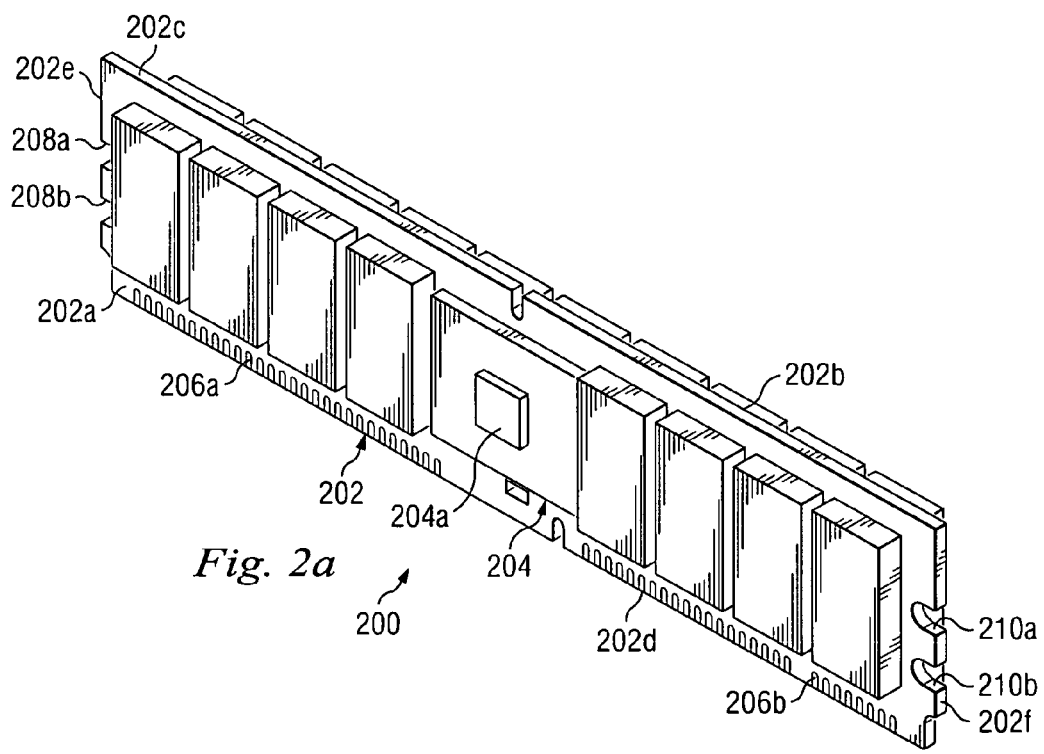
FIG. 2a is a perspective view illustrating an embodiment of a memory device.
Figure 2B:
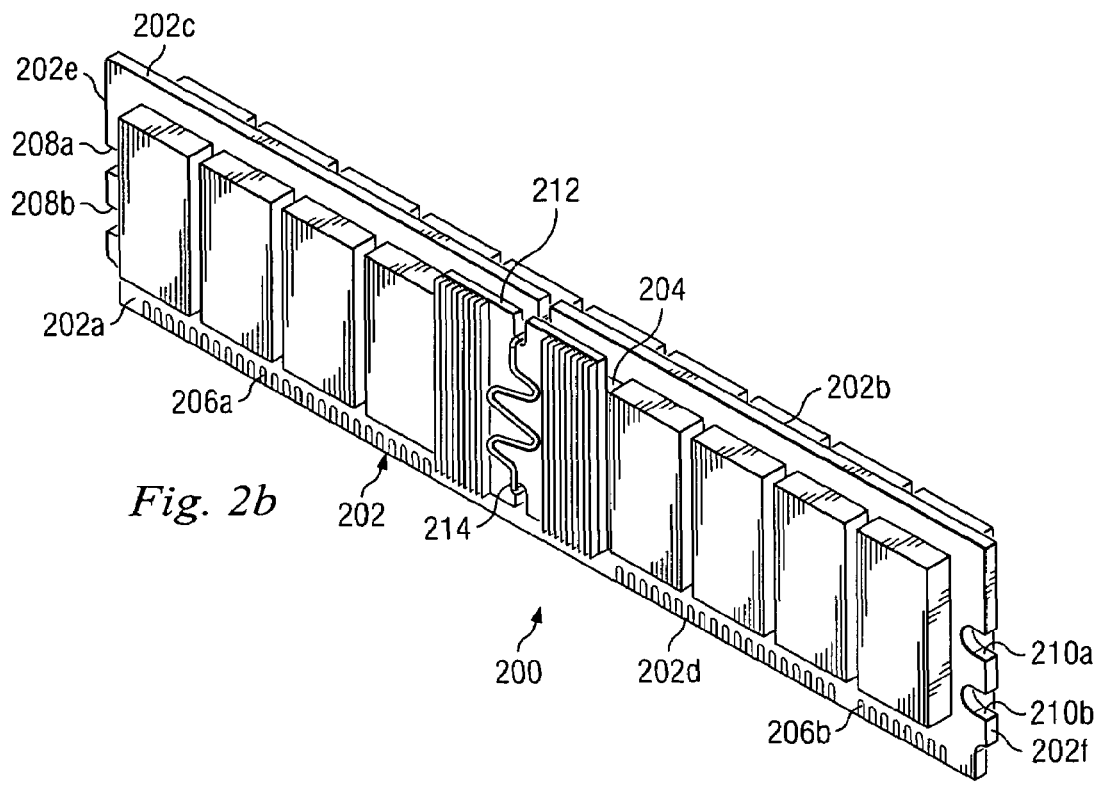
FIG. 2b is a perspective view illustrating an embodiment of the memory device of FIG. 2a with a heat dissipation device coupled to a chip on the memory device.

Referring now to FIGS. 2a and 2b, a memory device 200 is illustrated. The memory device 200 includes a base 202 having a front surface 202a, a rear surface 202b located opposite the front surface 202a, a top surface 202c extending between the front surface 202a and the rear surface 202b, a bottom surface 202d located opposite the top surface 202c and extending between the front surface 202a and the rear surface 202b, and a pair of opposing side surfaces 202e and 202f extending between the front surface 202a, the rear surface 202b, the top surface 202c, and the bottom surface 202d. A chip 204 including a heat transfer member 204a is coupled to and extends from the front surface 202a of the base 202 on memory device 200. In an embodiment, the chip 204 is a Dynamic Random Access Memory (DRAM) chip. In an embodiment, the chip 204 is an Advanced Memory Buffer (AMB) chip. A plurality of memory device contacts 206a and 206b are located on the base 202 of the memory device 200 adjacent the bottom surface 202d. A plurality of memory device notches 208a and 208b are defined by the base 202 and located in a spaced apart orientation from each other adjacent the side surface 202e of the memory device 200. A plurality of memory device notches 210a and 210b are defined by the base 202 and located in a spaced apart orientation from each other adjacent the side surface 202f of the memory device 200. In an embodiment, a heat dissipation device 212 is coupled to the chip 204 through engagement with the heat transfer member 204a and the engagement of a heat dissipation device coupling member 214 with the heat dissipation device 212 and the base 202, as illustrated in FIG. 2b.

Figure 3:
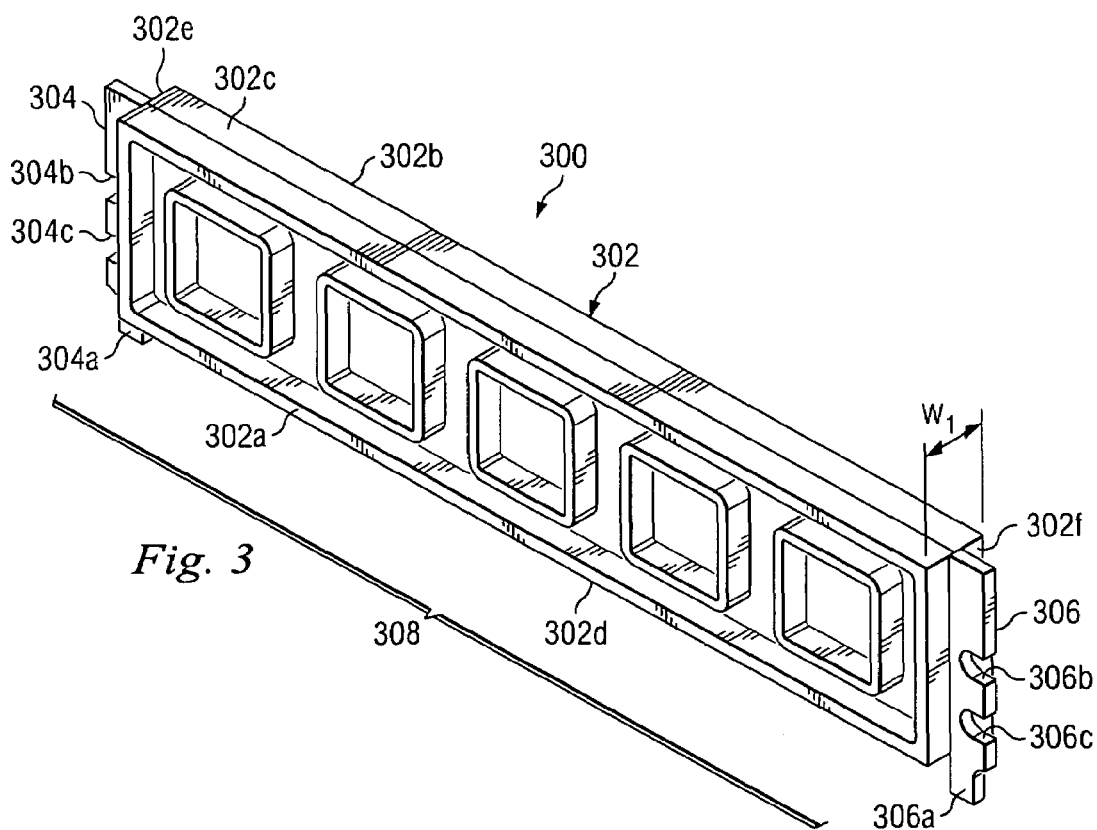
FIG. 3 is a perspective view illustrating an IHS cooling apparatus used with the memory device of FIGS. 2a and 2b.

Referring now to FIG. 3, an IHS cooling apparatus 300 is illustrated. The IHS cooling apparatus 300 includes a blank base 302 having a front surface 302a, a rear surface 302b located opposite the front surface 302a, a top surface 302c extending between the front surface 302a and the rear surface 302b, a bottom surface 302d located opposite the top surface 302c and extending between the front surface 302a and the rear surface 302b, and a pair of opposing side surfaces 302e and 302f extending between the front surface 302a, the rear surface 302b, the top surface 302c, and the bottom surface 302d. The blank base 302 includes a width $W_1$ which is measured from the front surface 302a to the rear surface 302b. In an embodiment, the blank base 302 is fabricated from a polycarbonate/acrylonitrile butadiene styrene (PC/ABS) material. The blank base 302 includes a connector coupling arm 304 extending from the side surface 302e. The connector coupling arm 304 includes a connector engagement member 304a which extends from the connector coupling arm 304 past the bottom surface 302d of the blank base 302 and is oriented substantially perpendicularly to the bottom surface 302d. A plurality of notch features 304b and 304c are defined by the connector coupling arm 304 and are located in a spaced apart orientation from each other. In an embodiment, the design, location, dimensions, and other attributes of the notch features 304b and 304c are governed by Joint Electron Device Engineering Council (JEDEC) specification MO-256B such that the IHS cooling apparatus 300 may couple to any industry standard Dual Inline Memory Module (DIMM) connector. The blank base 302 also includes a connector coupling arm 306 extending from the side surface 302f. The connector coupling arm 306 includes a connector engagement member 306a which extends from the connector coupling arm 306 past the bottom surface 302d of the blank base 302 and is oriented substantially perpendicularly to the bottom surface 302d. A plurality of notch features 306b and 306c are defined by the connector coupling arm 306 and are located in a spaced apart orientation from each other. In an embodiment, the design, location, dimensions, and other attributes of the notch features 306b and 306c are governed by Joint Electron Device Engineering Council (JEDEC) specification MO-256B such that the IHS cooling apparatus 300 may couple to any industry standard Dual Inline Memory Module (DIMM) connector. A contacts channel 308 is defined along the length of the blank base 302 by the bottom surface 302d and the connector engagement members 304a and 304b such that the contacts channel 308 is located adjacent the bottom surface 302d and between the connector engagement members 304a and 304b.

Figure 4A:
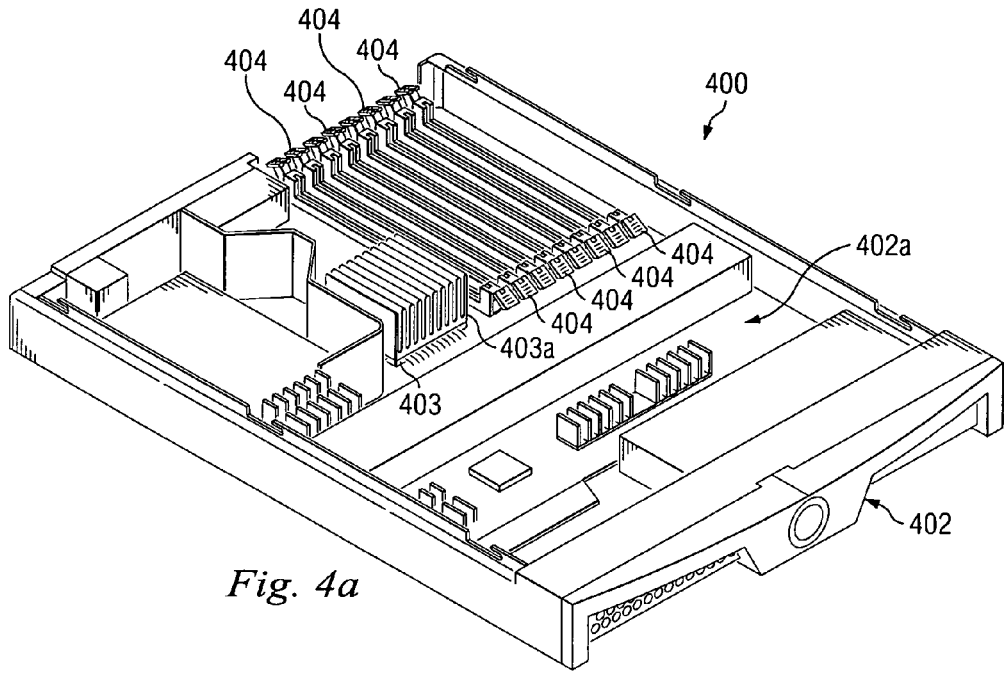
FIG. 4a is a perspective view illustrating an embodiment of a chassis used with the memory device of FIGS. 2a and 2b and the IHS cooling apparatus of FIG. 3.
Figure 4B:
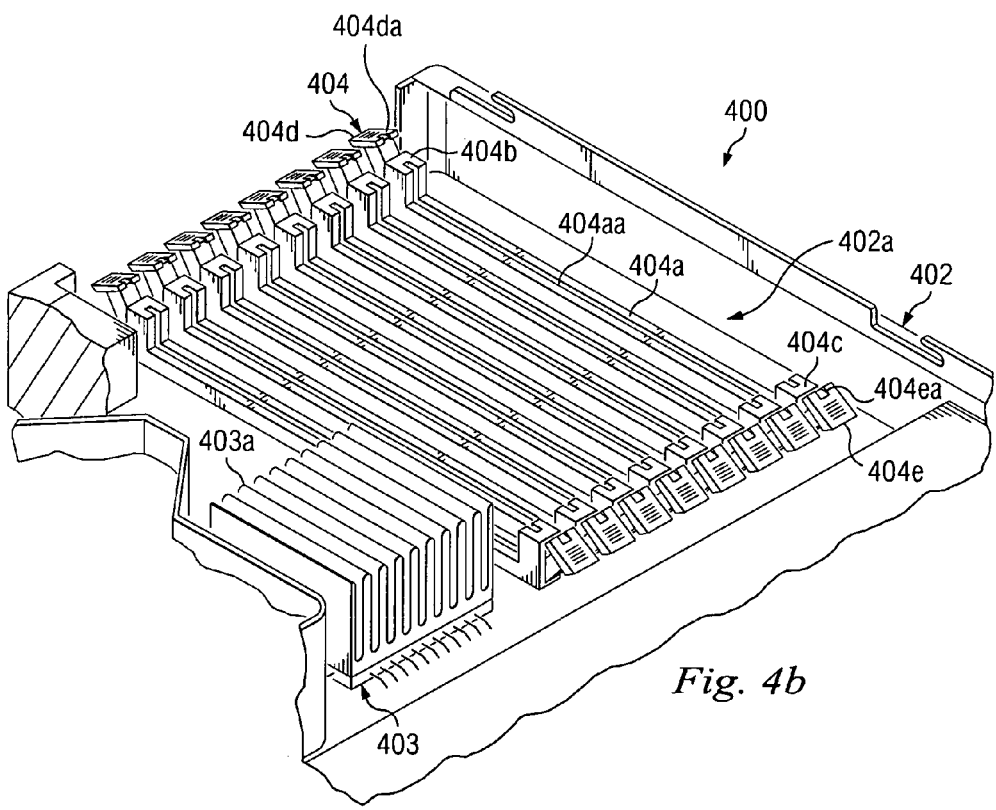

Referring now to FIGS. 4a and 4b, a chassis 400 is illustrated. In an embodiment, the chassis 400 may be, for example, the chassis 116, described above with reference to FIG. 1, and may house some or all of the components of the IHS 100, described above with reference to FIG. 1. The chassis 400 includes a base 402 that defines a component housing 402a. A microprocessor 403 is coupled to the base 402 and located in the component housing 402a. A heat sink 403a is coupled to the microprocessor 403 and located in the component housing 402a. In an embodiment, a plurality of IHS components known in the art may be coupled to the Referring now to FIGS. 4a and 4b, a chassis 400 is illustrated. In an embodiment, the chassis 400 may be, for example, the chassis 116, described above with reference to FIG. 1, and may house some or all of the components of the IHS 100, described above with reference to FIG. 1. The chassis 400 includes a base 402 that defines a component housing 402a. A microprocessor 403 is coupled to the base 402 and located in the component housing 402a. A heat sink 403a is coupled to the microprocessor 403 and is located in the component housing 402a. In an embodiment, a plurality of IHS components known in the art may be coupled to the base 402 and located in the component housing 402a. A plurality of connectors 404 are mounted in the base 402, located in the component housing 402a, and electrically coupled to the microprocessor 403. In an embodiment, the plurality of connectors 404 include at least one memory device connector. In an embodiment, the plurality of connectors 404 include at least one 240-pin DIMM connector. Each connector 404 includes an elongated base 404a that defines a connector channel 404aa along its length that includes a plurality of contacts which may be electrically coupled to the microprocessor 403. The elongated base 404a includes a pair of opposing ends 404b and 404c which also define the connector channel 404aa. A securing member 404d including a securing beam 404da on its distal end is moveably coupled to the elongated base 404a and located adjacent the end 404b of the elongated base 404a. A securing member 404e including a securing beam 404ea on its distal end is moveably coupled to the elongated base 404a and located adjacent the end 404c of the elongated base 404a.

Figure 5A:
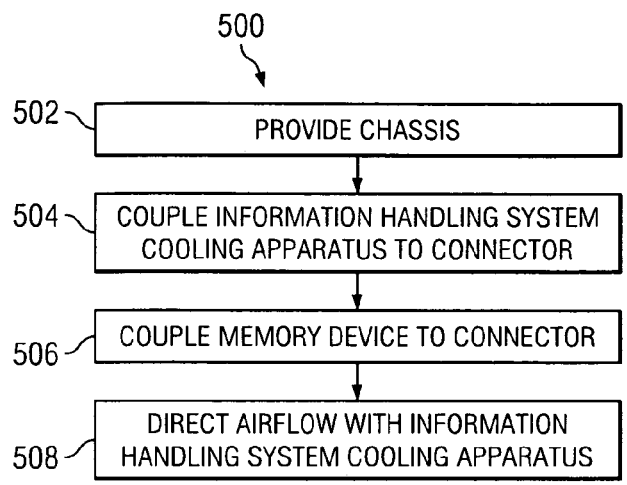
FIG. 5a is a flow chart illustrating an embodiment of a method of cooling an IHS.
Figure 5B:
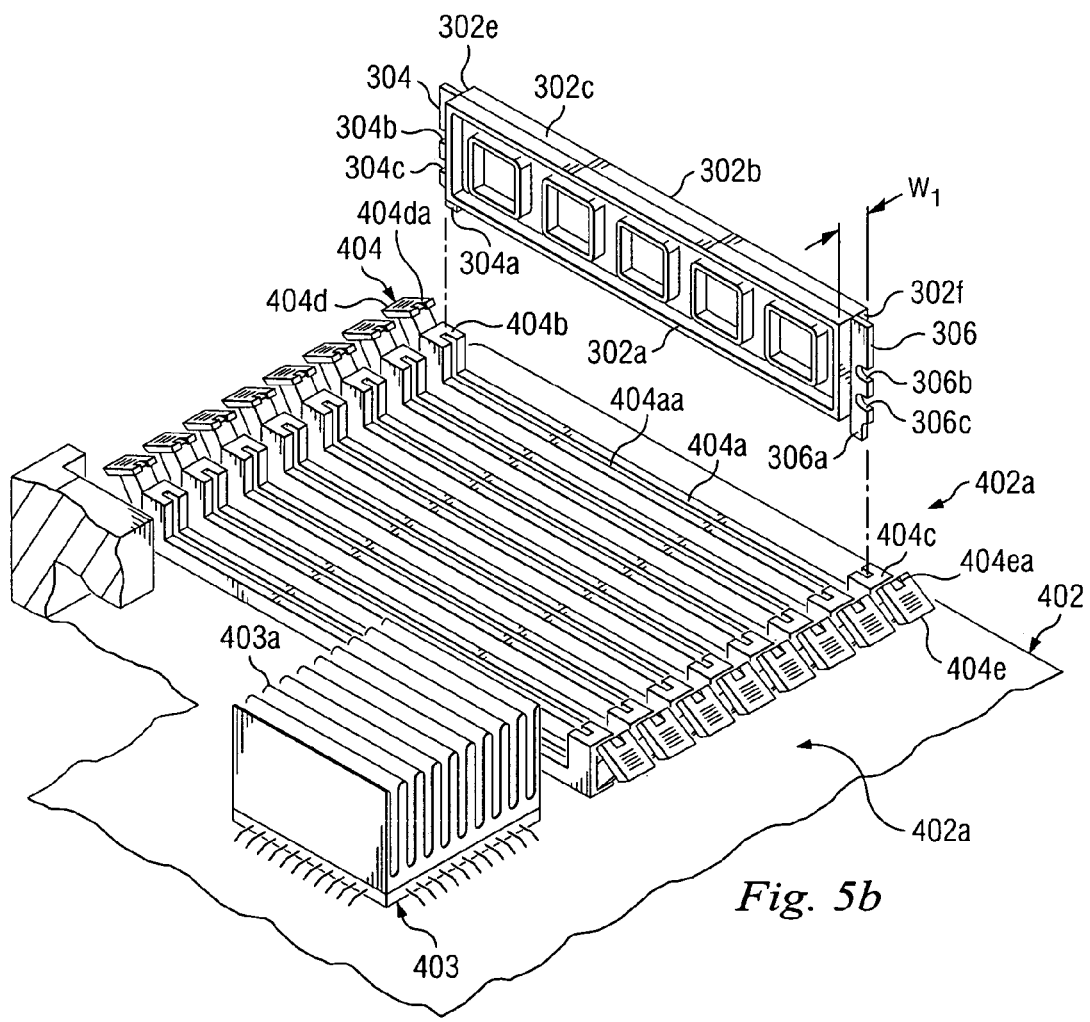
FIG. 5b is a perspective view illustrating an embodiment of the IHS cooling apparatus of FIG. 3 being secured to the chassis of FIGS. 4a and 4b.
Figure 5C:
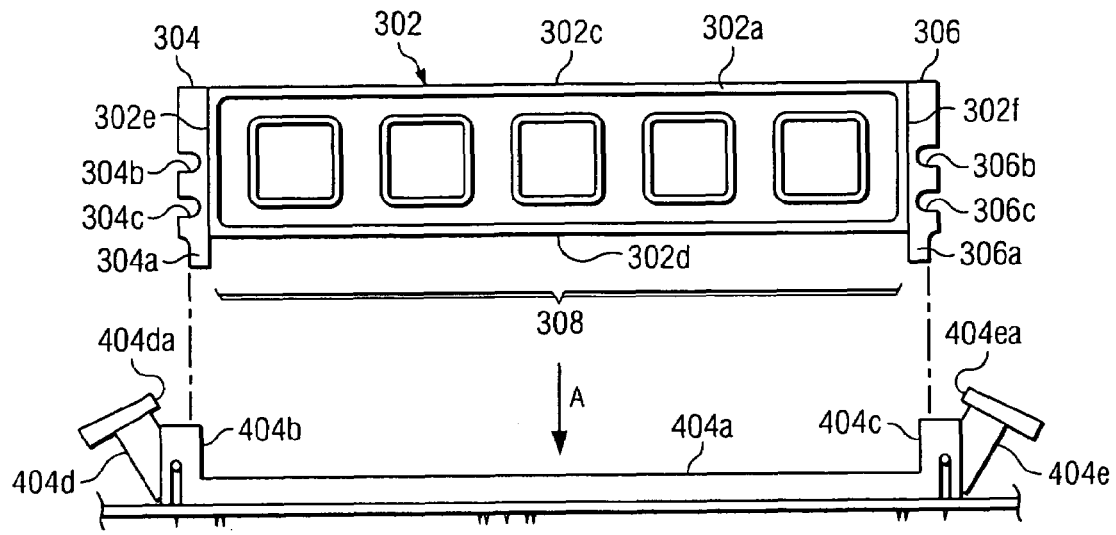
FIG. 5c is a side view illustrating an embodiment of the IHS cooling apparatus of FIG. 3 being secured to the chassis of FIGS. 4a and 4b.
Figure 5D:
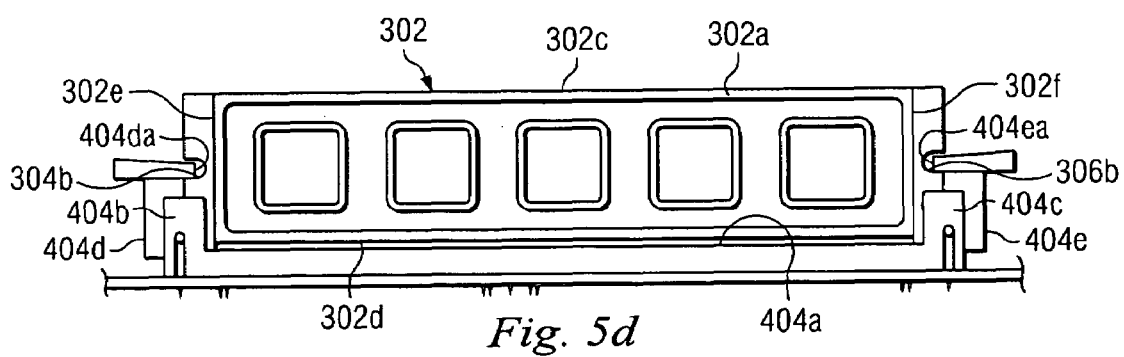
FIG. 5d is a side view illustrating an embodiment of the IHS cooling apparatus of FIG. 3 secured to the chassis of FIGS. 4a and 4b.
Figure 5E:
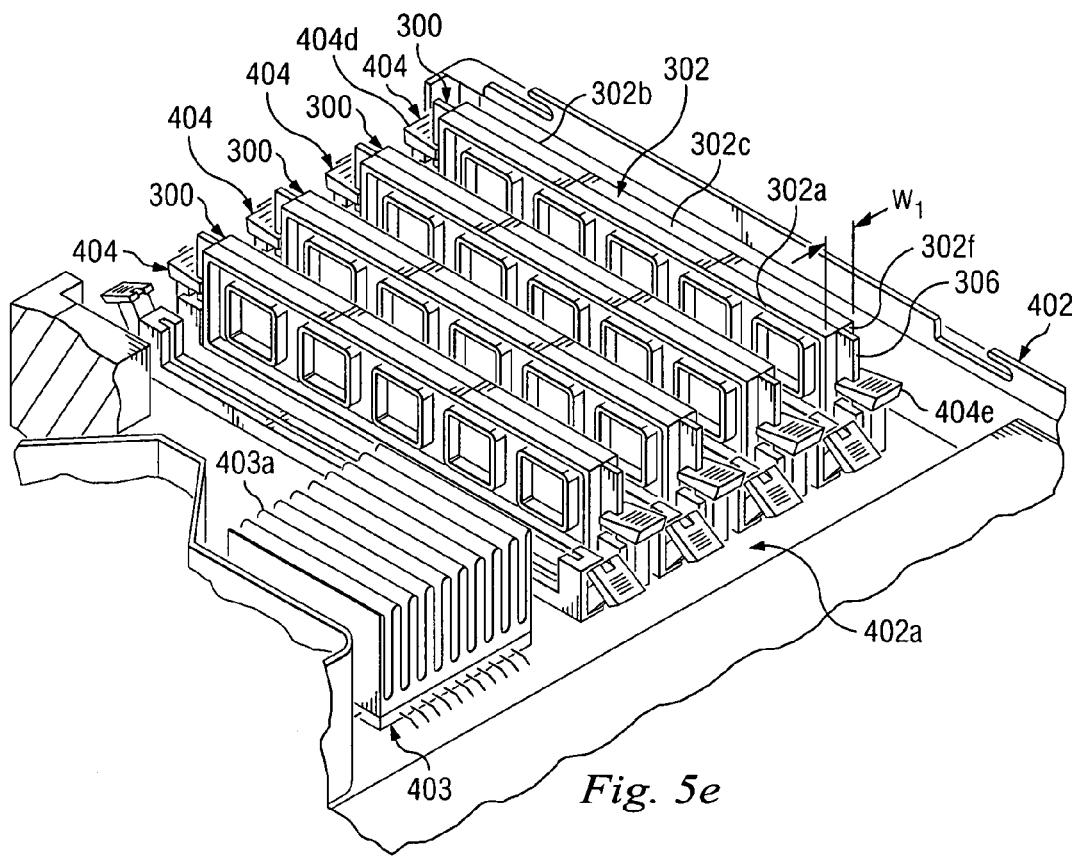
FIG. 5e is a perspective view illustrating an embodiment of a plurality of the IHS cooling apparatus of FIG. 3 secured to the chassis of FIGS. 4a and 4b.
Figure 5F:
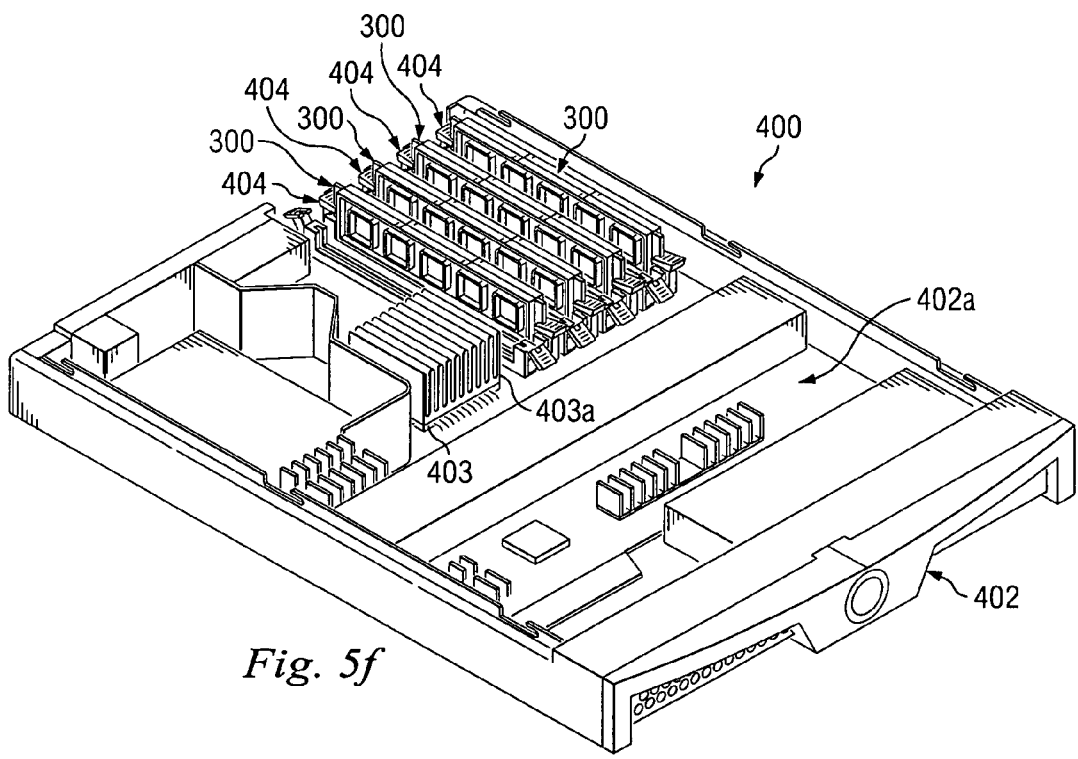
FIG. 5f is a perspective view illustrating an embodiment of a plurality of the IHS cooling apparatus of FIG. 3 secured to the chassis of FIGS. 4a and 4b.

Referring now to FIGS. 3, 4a, 4b, 5a, 5b, 5c, 5d, 5e, and 5f, a method 500 for cooling an IHS is illustrated. The method 500 begins at step 502 where the chassis 400, illustrated in FIGS. 4a and 4b, is provided. The method then proceeds to step 504 where an IHS cooling apparatus is coupled to a connector. The IHS cooling apparatus 300, described above with reference to FIG. 3, is positioned adjacent the chassis 400 such that it is adjacent a connector 404 in the component housing 402a. With the IHS cooling apparatus 300 adjacent the connector 404, the contacts channel 308 is located adjacent the elongated base 404a, the connector engagement member 304a is located adjacent the end 404b of the connector 404, and the connector engagement member 306a is located adjacent the end 404c of the connector 404, as illustrated in FIGS. 5b and 5c. The IHS cooling apparatus 300 is then moved in a direction A such that the connector engagement member 304a enters the connector channel 404aa adjacent the end 404b and engages the connector 404 and the connector engagement member 306a enters the connector channel 404aa adjacent the end 404c and engages the connector 404. The engagement of the connector engagement members 304a and 306a with the connector 404 results in securing members 404d and 404e, respectively, rotating with respect to the connector 404 such that the securing beams 404da and 404ea, respectively, enter the notch features 304b and 306b, respectively, on the IHS cooling apparatus 300, securing the IHS cooling apparatus 300 to the connector 404, as illustrated in FIG. 5d. With the IHS cooling apparatus 300 secured to the connector 404, the elongated base 404a is located in the contacts channel 308 such that the contacts located in the connector channel 404aa defined by the elongated base 404a are not engaged by the IHS cooling apparatus 300, which restricts the contacts from being cycled, reducing the risk of contact contamination, contact deformation, and the production of harmful static electricity. In an embodiment, a plurality of IHS cooling apparatus 300 may be secured in a plurality of the connectors 404 in substantially the same manner as described above, as illustrated in FIGS. 5e and 5f.

Figure 5G:
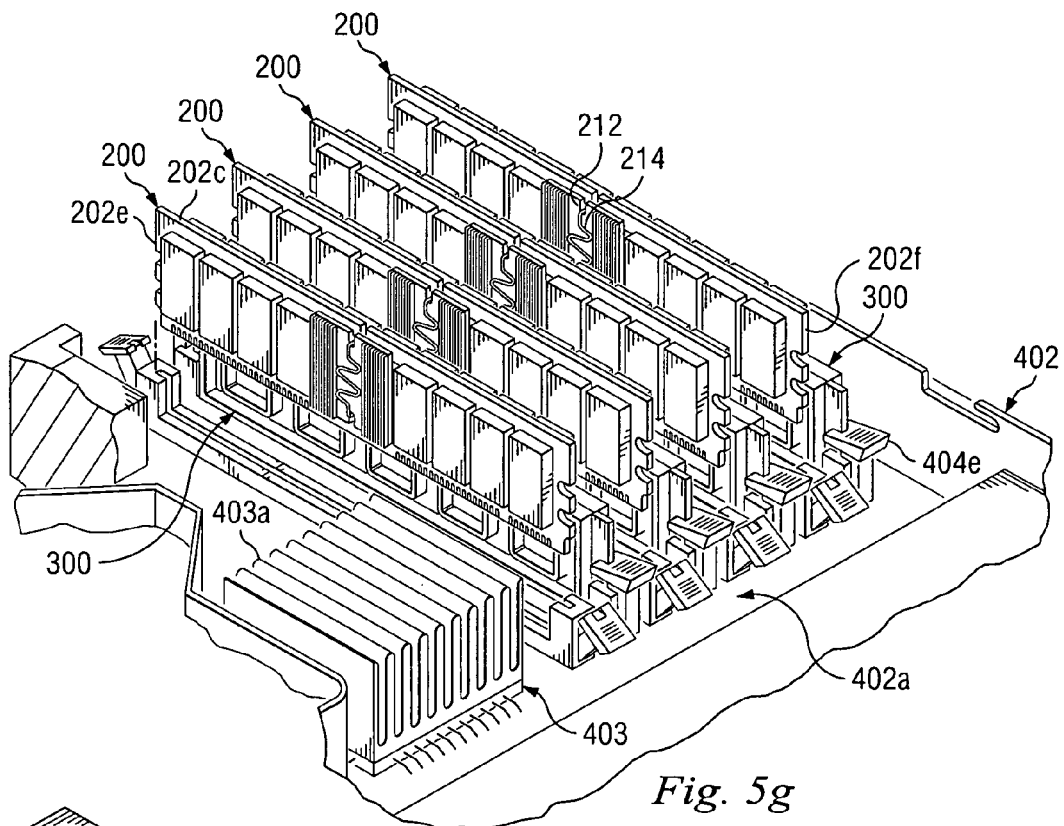
FIG. 5g is a perspective view illustrating an embodiment of a plurality of the memory devices of FIG. 2b being secured to the chassis of FIGS. 4a and 4b.

Referring now to FIGS. 2a, 2b, 5a, 5e, 5f, and 5g, the method 500 proceeds to step 508 where a memory device is coupled to a connector. A plurality of memory devices 200 may be secured to the connectors 404 which do not have an IHS cooling apparatus 300 secured to them, as illustrated in FIG. 5g, in substantially the same manner as described above for the securing of the IHS cooling apparatus 300 to the connector 404, with the provision of the memory device notches 208a and 210a taking the place and providing the function of the notch features 304b and 306b on the IHS cooling apparatus 300 and the memory device contacts 206a and 206b engaging the contacts located in the connector channel 404aa defined by the elongated base 404a. In an embodiment, the plurality of connectors 404 include either an IHS cooling apparatus 300 or a memory device 200 secured to them, as illustrated in FIG. 5g.

Figure 5H:
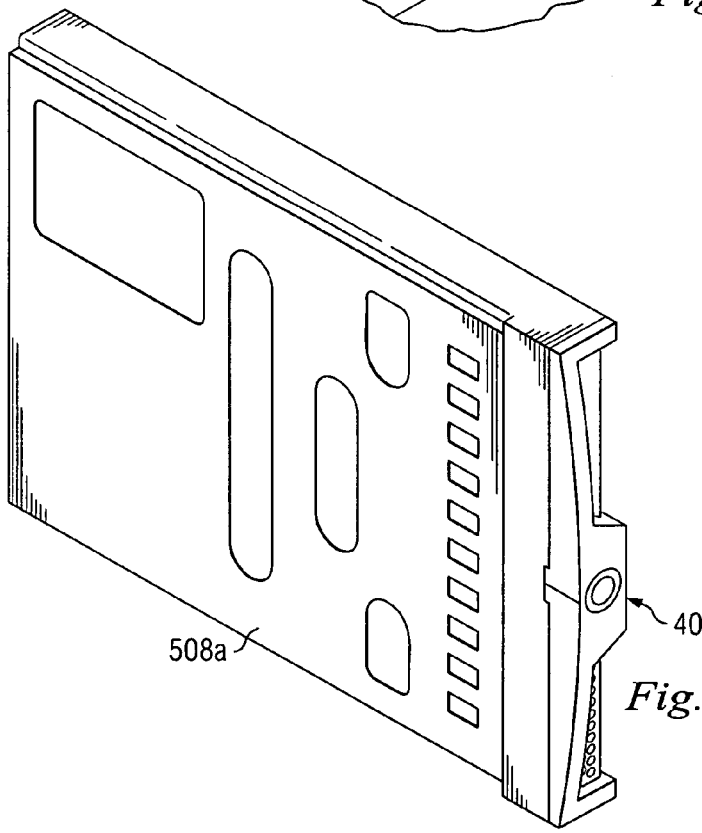
FIG. 5h is a perspective view illustrating an embodiment of a top coupled to the chassis of FIG. 5g.
Figure 5I:
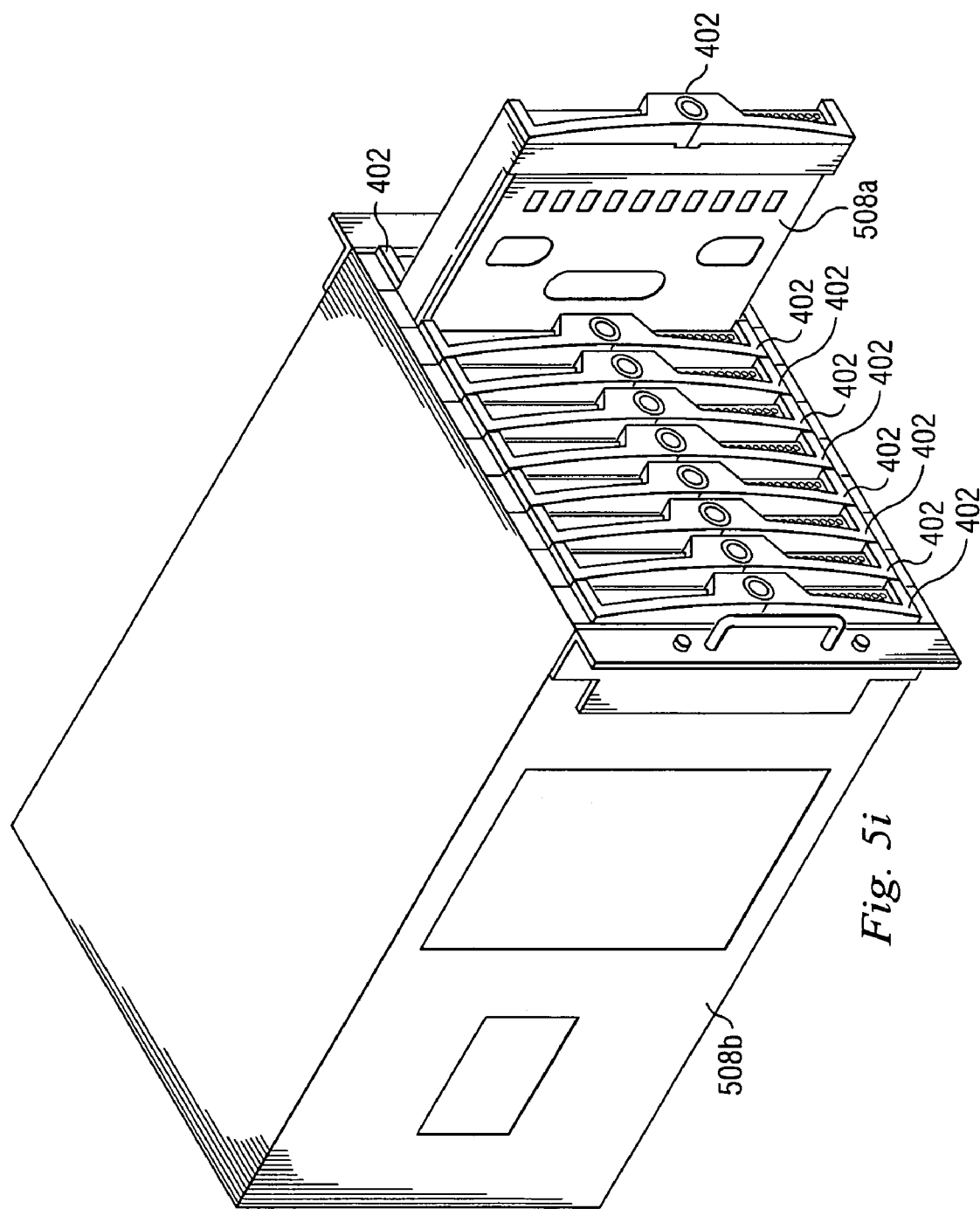
FIG. 5i is a perspective view illustrating an embodiment of a plurality of the chassis of FIG. 5h located in a chassis.
Figure 5J:
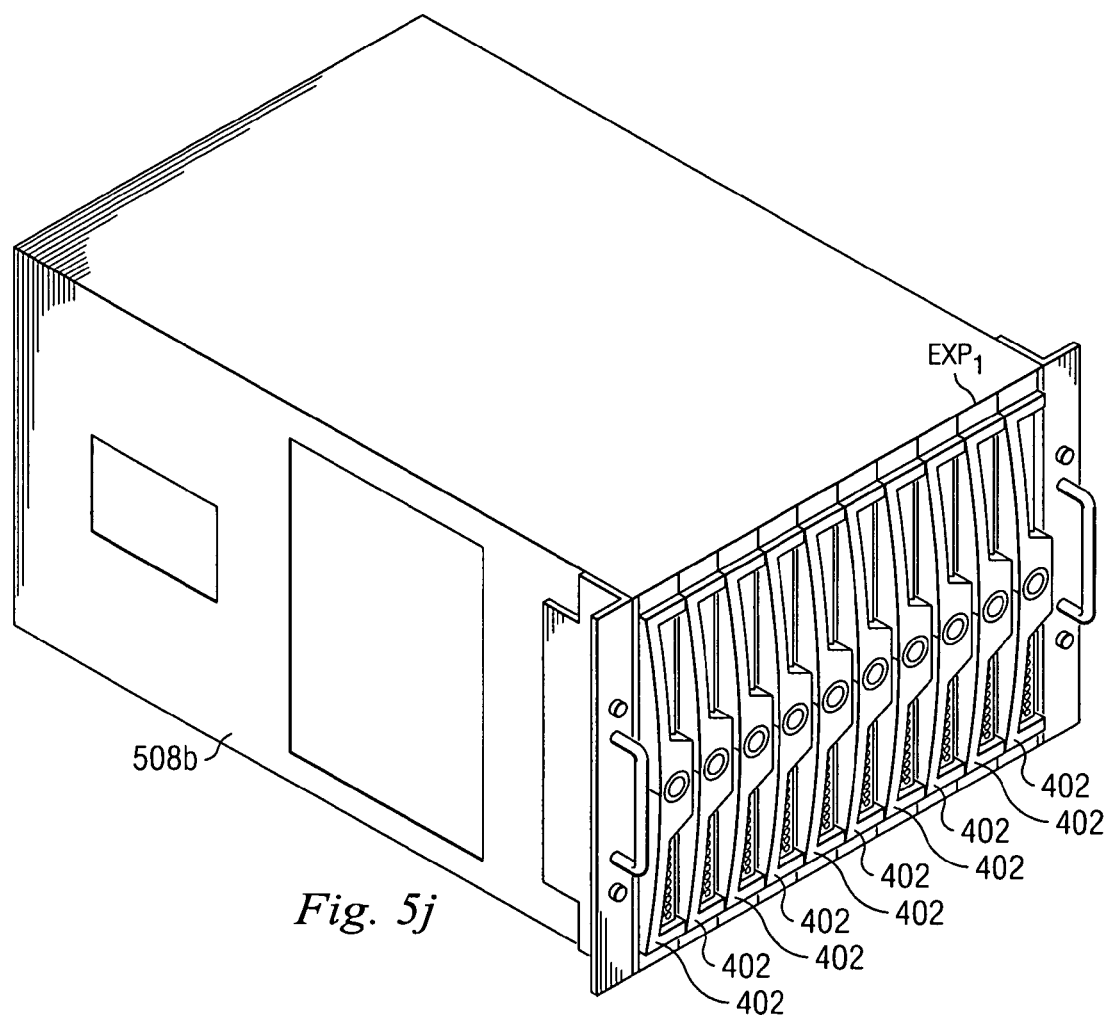
FIG. 5j is a perspective view illustrating an experimental embodiment of chassis of FIG. 5i.

Referring now to FIGS. 3, 4a, 4b, 5a, 5g, 5h, 5i, and 5j, the method 500 then proceeds to step 508 where airflow is directed with the IHS cooling apparatus. A cover 508a is provided and coupled to the base 402 of the chassis 400, as illustrated in FIG. 5h. A chassis 508b is provided which includes a plurality of air moving devices (not shown) such as, for example, fans. A plurality of the chassis 400 are coupled to the chassis 508b, as illustrated in FIG. 5i, such that the air moving devices in the chassis 508b may be operated in order to draw air through the chassis 400. Due to the dense packing of the chassis 400 in the chassis 508b, the chassis 400 are not provided with enough space to include conventional airflow blocking members moveably coupled to the chassis 400. However, when the air moving devices are operated, the IHS cooling apparatus 300 will restrict air from flowing over the connectors 404 which are securing the IHS cooling apparatus 300 due to the width $W_1$ of the IHS cooling apparatus 300 blocking the airflow. The IHS cooling apparatus 300 will instead direct that air over the connectors 404 which are securing the memory devices 200, cooling the memory devices 200. In an exemplary experimental embodiment, illustrated in FIG. 5j, the chassis 400 was a blade chassis housing a blade IHS and was placed in blade location nine $EXP_1$. In the experimental embodiment, the IHS cooling apparatus 300 provided 0.5 watts of additional cooling for a 4×4GB Hynix 533MHz FBD DIMM with an Advanced Memory Buffer (AMB) chip and 0.3 watts of additional cooling for a 4×4GB Hynix 533MHz FBD DIMM with an Dynamic random Access Memory (DRAM) chip.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system ('IHS') cooling apparatus, comprising:
    a blank base comprising a pair of opposing ends and a base perimeter that is dimensioned such that, when the IHS cooling apparatus is coupled to a connector that includes a connector perimeter defining a connector boundary extending perpendicularly from a surface to which the connector is mounted, the base perimeter does not extend substantially beyond the connector boundary;
    a connector engagement member extending from each opposing end of the blank base;
    a notch defined by the blank base and located on each opposing end of the blank base; and
    a contacts channel defined by the blank base and the connector engagement members and extending between the opposing ends of the blank base.

2. The apparatus of claim 1, wherein the blank base comprises a base width that is operable to block airflow across the width of the connector when the IHS cooling apparatus is coupled to the connector.

3. The apparatus of claim 1, wherein the connector engagement members and the notches are operable to couple the blank base to a memory device connector.

4. The apparatus of claim 1, wherein the connector engagement members and the notches are operable to couple the blank base to a 240-pin Dual Inline Memory Module (DIMM) connector.

5. The apparatus of claim 1, wherein each opposing end of the blank base includes a plurality of notches defined by the blank base.

6. The apparatus of claim 1, wherein the design, location, dimensions, and other attributes of the notch are governed by Joint Electron Device Engineering Council (JEDEC) specification MO-256B such that the IHS cooling apparatus may couple to any industry standard Dual Inline Memory Module (DIMM) connector.

7. An information handling system (IHS), comprising:
    a chassis;
    a microprocessor coupled to the chassis;
    a plurality of connectors mounted in a side by side orientation in the chassis and coupled to the microprocessor, wherein each connector comprises a connector perimeter that defines a connector boundary extending perpendicularly from the surface to which the connector is mounted; and at least one IHS cooling apparatus located in one of the connectors, the IHS cooling apparatus comprising:
- a blank base comprising a pair of opposing ends and a base perimeter dimensioned such that the base perimeter does not extend into the connector boundary defined by any connector located adjacent the connector to which the IHS cooling apparatus is coupled;
- a connector engagement member extending from each opposing end of the blank base and engaging the connector;
- a notch feature defined by the blank base, located on each opposing end of the blank base, and engaging the connector; and
- a contacts channel defined by the blank base and the connector engagement members and extending between the opposing ends of the blank base, whereby the connector is located in the contact channel and the IHS cooling apparatus does not engage a contact on the connector.

8. The system of claim 7, wherein the blank base comprises a base width that is operable to block airflow across a width of the connector to which the IHS apparatus is coupled.

9. The system of claim 7, wherein the connectors comprises at least one memory device connector.

10. The system of claim 7, wherein the connectors comprise at least one 240-pin Dual Inline Memory Module (DIMM) connector.

11. The system of claim 7, wherein each opposing end of the blank base includes a plurality of notch features defined by the blank base.

12. The system of claim 7, wherein the design, location, dimensions, and other attributes of the notch feature are governed by Joint Electron Device Engineering Council (JEDEC) specification MO-256B such that the IHS cooling apparatus may couple to any industry standard Dual Inline Memory Module (DIMM) connector.

13. The system of claim 7, further comprising:
a memory device coupled to at least one of the connectors.

14. The system of claim 13, wherein the plurality of connectors each comprise one of a memory device coupled to the connector and an IHS cooling apparatus coupled to the connector.

15. The system of claim 7, further comprising:
a Dual Inline Memory Module (DIMM) device coupled to at least one of the connectors.

16. The system of claim 15, wherein the plurality of connectors comprise one of an IHS cooling apparatus coupled to the connector and a Dual Inline Memory Module (DIMM) device coupled to the connector, whereby the IHS cooling apparatus are operable to direct airflow over the Dual Inline Memory Module (DIMM) device.

17. The system of claim 16, wherein the IHS cooling apparatus are operable to provide at least 0.3 watts of additional cooling per DIMM device relative to a conventional cooling apparatus.

18. A method for cooling an information handling system (IHS), comprising:
providing an IHS chassis housing an IHS and comprising a plurality of connectors coupled to the IHS in a side by side orientation, wherein each of the plurality of connectors includes a connector perimeter that defines a connector boundary extending perpendicularly from a surface to which the connector is coupled;

coupling a memory device to at least one of the plurality of connectors;

coupling an IHS cooling apparatus to each connector without a memory devices wherein each IHS cooling apparatus comprises an apparatus perimeter dimensioned such that the apparatus perimeter does not extend into the connector boundary defined by any connector located adjacent the connector to which the IHS cooling apparatus is coupled, and wherein the coupling comprises the connector engaging a notch feature on the IHS cooling apparatus to secure the IHS cooling apparatus to the connector; and directing airflow with the IHS cooling apparatus such that the airflow is directed over the memory device.

19. The method of claim 18, wherein the coupling an IHS cooling apparatus to each connector without a memory device comprises coupling the IHS cooling apparatus to each connector without engaging a contact on the connector.

20. The method of claim 19, wherein the coupling a memory device to at least one of the plurality of connectors comprises coupling a Dual Inline Memory Module (DIMM) device to at least one of the plurality of connectors such that the directing airflow with the IHS cooling apparatus such that the airflow is directed over the memory device comprises providing at least 0.3 watts of additional cooling per DIMM device relative to a conventional cooling apparatus.

* * * * *

UNITED STATES PATENT AND TRADEMARK OFFICE
CERTIFICATE OF CORRECTION

| | |
|---|---|
| PATENT NO. | : 7,403,383 B2 |
| APPLICATION NO. | : 11/430661 |
| DATED | : July 22, 2008 |
| INVENTOR(S) | : Matthew Stanley McGuff et al. |

It is certified that error appears in the above-identified patent and that said Letters Patent is hereby corrected as shown below:

Claim 18, Column 8, Lines 22-23, delete "devices" and insert --device,--.

Signed and Sealed this

Tenth Day of March, 2009

JOHN DOLL
*Acting Director of the United States Patent and Trademark Office*